United States Patent
Yin et al.

(10) Patent No.: US 8,565,795 B2
(45) Date of Patent: Oct. 22, 2013

(54) METHOD AND APPARATUS FOR ALLOCATING PAGING AREAS

(75) Inventors: Yu Yin, Shanghai (CN); Weihua Hu, Shanghai (CA); Qing Zhou, Berlin (DE)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 13/538,800

(22) Filed: Jun. 29, 2012

(65) Prior Publication Data

US 2012/0270556 A1  Oct. 25, 2012

Related U.S. Application Data

(63) Continuation of application No. 13/073,529, filed on Mar. 28, 2011, now Pat. No. 8,271,001, which is a continuation of application No. PCT/CN2009/073906, filed on Sep. 14, 2009.

(30) Foreign Application Priority Data

Sep. 28, 2008 (CN) .......................... 2008 1 0169533

(51) Int. Cl.
*H04W 72/04* (2009.01)
(52) U.S. Cl.
USPC .................................. 455/458; 455/435.1
(58) Field of Classification Search
USPC ......................... 455/435.1, 458, 515
See application file for complete search history.

(56) References Cited

U.S. PATENT DOCUMENTS

| 5,875,400 | A | 2/1999 | Madhavapeddy et al. |
| 2004/0093466 | A1* | 5/2004 | Hull .............................. 711/133 |
| 2007/0104146 | A1 | 5/2007 | Hossain et al. |
| 2010/0153999 | A1 | 6/2010 | Yates |

FOREIGN PATENT DOCUMENTS

| CN | 1810059 A | 7/2006 |
| CN | 101170816 A | 4/2008 |
| EP | 1434398 A1 | 6/2004 |
| EP | 1534031 A2 | 5/2005 |
| EP | 1838122 A1 | 9/2007 |
| EP | 1879414 S1 | 1/2008 |
| JP | 2006211335 A | 8/2006 |
| KR | 100687694 B1 | 2/2007 |

OTHER PUBLICATIONS

Extended European Search Report issued in corresponding European Patent Application No. 09815599.7, mailed Dec. 2, 2011.
International Search Report issued in corresponding PCT Patent Application No. PCT/CN2009/073906, mailed Dec. 3, 2009.
Written Opinion of the International Searching Authority issued in corresponding PCT Patent Application No. PCT/CN2009/073906, mailed Dec. 3, 2009.

(Continued)

*Primary Examiner* — Sam Bhatttacharya
(74) *Attorney, Agent, or Firm* — Brinks Hofer Gilson & Lione

(57) ABSTRACT

A method for allocating paging areas includes: determining a basic paging area currently visited by a User Equipment (UE); and allocating a paging area to this UE according to a history record of motion trace of UEs located in the basic paging area currently visited by this UE. An apparatus for allocating paging areas is disclosed.

18 Claims, 8 Drawing Sheets

(56) References Cited

OTHER PUBLICATIONS

Lam et al., "On Using Handoff Statistics and Velocity for Location Management in Cellular Wireless Networks" The Computer Journal, vol. 48 No. 1, The British Computer Society 2005.

Wu at al., "Personal Paging Area Design Based on Mobile's Moving Behaviors" IEEE Infocom 2001.

Yavas et al., "A Data Mining Approach for Location Prediction in Mobile Environments" Data & Knowledge Engineering, vol. 54 2005.

Office Action issued in corresponding Chinese Patent Application No. 200810169533.7, mailed Jun. 5, 2012.

* cited by examiner

METHOD AND APPARATUS FOR ALLOCATING PAGING AREAS

CROSS-REFERENCE TO RELATED APPLICATIONS

This application is a continuation of U.S. patent application Ser. No. 13/073,529, filed on Mar. 28, 2011, which is a continuation of International Application No. PCT/CN2009/073906, filed on Sep. 14, 2009. The International Application claims priority to Chinese Patent Application No. 200810169533.7, filed on Sep. 28, 2008. The aforementioned patent applications are hereby incorporated by reference in their entireties.

FIELD OF THE INVENTION

The present invention relates to a radio paging technology, and in particular, to a technology of allocating paging areas.

BACKGROUND OF THE INVENTION

In a wireless communication system, User Equipment (UE) changes to the idle state when no service is active in order to reduce power consumption and save radio resources. When the UE is idle, the connection between the UE and the communication network is released. If the communication network wants to contact the UE, the communication network needs to page the UE. Multiple wireless coverage areas adjacent to each other are generally designed in a communication system to control overhead of paging messages. When a UE is idle, the scope of the variable location of the UE tracked by the communication network is a wireless coverage area. If the communication network wants to page a UE when the UE is in a wireless coverage area, the communication network needs only to page the UE within the wireless coverage area that covers the UE. The wireless coverage area here is called a paging area. When the UE leaves the paging area, the UE needs to notify the communication network to update the location information of the UE and request the communication network to allocate a new paging area.

In practical application, if the paging area is too small, the UE may leave the current paging area and enters a new paging area frequently in the motion process, and much location update signaling is generated. If the paging area is too wide, when the communication network pages a UE, the communication needs to send paging messages within a wide scope, which leads to high load of paging. Therefore, in the planning of paging areas in the deployment of a communication network, a tradeoff between the amount of location update signaling and the paging overhead needs to be accomplished.

In some communication networks, multiple small wireless coverage areas are planned to control the coverage of the paging area flexibly and avoid change of the wireless configuration parameters, and one or more small wireless coverage areas generally combine into a larger wireless coverage area which is allocated as a paging area to the UE. The small wireless coverage areas are called "basic paging areas". If one paging area includes multiple basic paging areas, the UE does not need to initiate location update to the communication network when the UE moves between the basic paging areas. For example, in an Evolved Packet System (EPS), multiple Tracking Areas (TAs) are planned. When allocating paging areas to the UEs, the EPS may allocate one TA or a larger area composed of multiple TAs to a UE as a paging area based on a certain algorithm according to the region, type of the user of the UE, time segment, and other various conditions. A set of TAs included in a paging area allocated to a UE is called a TA list in the EPS. If a paging area allocated to the UE includes multiple TAs, the UE does not need to initiate location update to the EPS when the UE moves between the TAs.

In the prior art, communication technicians perform on-site survey, analyze the adjacent basic paging areas to be potentially visited by the UE after the UE moves to a basic paging area, and then configure this basic paging area and the adjacent basic paging areas to be visited potentially as a TA list into the communication network. When the communication network allocates a paging area to a UE located in this basic paging area, the communication network allocates the configured TA list corresponding to this basic paging area to the UE.

In the process of implementing the present invention, the inventor finds that: In the prior art, the paging area allocated by the communication network to the UE is relatively fixed. In practice, however, the motion of the UE in the communication network keeps changing. For a specific paging area or basic paging area, the location update procedure and the paging load in this area keep changing quickly and dynamically for certain reasons. In this case, if the paging area configured in the communication network is relatively fixed and the paging area allocated to the UE is also fixed, the previously deployed paging area can hardly adapt to the dynamic change of the location update procedure and the paging load quickly, and the communication network can hardly adjust the basic paging areas included in the paging area allocated to the UE in time.

SUMMARY OF THE INVENTION

The embodiments of the present invention provide a method and an apparatus for allocating paging areas in order to allocate paging areas flexibly and appropriately.

A method for allocating paging areas includes: determining a basic paging area currently visited by a UE; and allocating a paging area to this UE according to a history record of motion trace of UEs located in the basic paging area currently visited by this UE.

An apparatus for allocating paging areas includes: a determining unit, adapted to determine a basic paging area currently visited by a UE; and a paging area allocating unit, adapted to allocate a paging area to this UE according to a history record of motion trace of UEs located in the basic paging area determined by the determining unit.

In the embodiments of the present invention, a paging area is allocated to a UE according to the history record of subsequent motion trace of the UEs located in the basic paging area currently visited by the UE. The history record is equivalent to a motion model of multiple UEs, and is updated over time. In this way, a paging area is allocated to a UE according to the updated motion model of multiple UEs, which minimizes the amount of location update signaling sent by the UE subsequently and the signaling overhead consumed in the paging. Therefore, the paging area allocated to the UE is appropriate.

BRIEF DESCRIPTION OF THE DRAWINGS

To illustrate the technical solution under the present invention or the prior art more clearly, the following outlines the accompanying drawings involved in description of the embodiments of the present invention or the prior art. Apparently, the accompanying drawings outlined below are illustrative rather than exhaustive. Persons of ordinary skill in the art can derive other drawings from such accompanying drawings without any creative effort.

DETAILED DESCRIPTION OF THE EMBODIMENTS

The following detailed description is given in conjunction with the accompanying drawings in order to provide a thorough understanding of the present invention. Evidently, the drawings and the detailed description are merely representative of particular embodiments of the present invention, and the embodiments are illustrative in nature rather than exhaustive. All other embodiments, which can be derived by those skilled in the art from the embodiments given herein without any creative effort, shall fall within the scope of the present invention.

Figure 1:
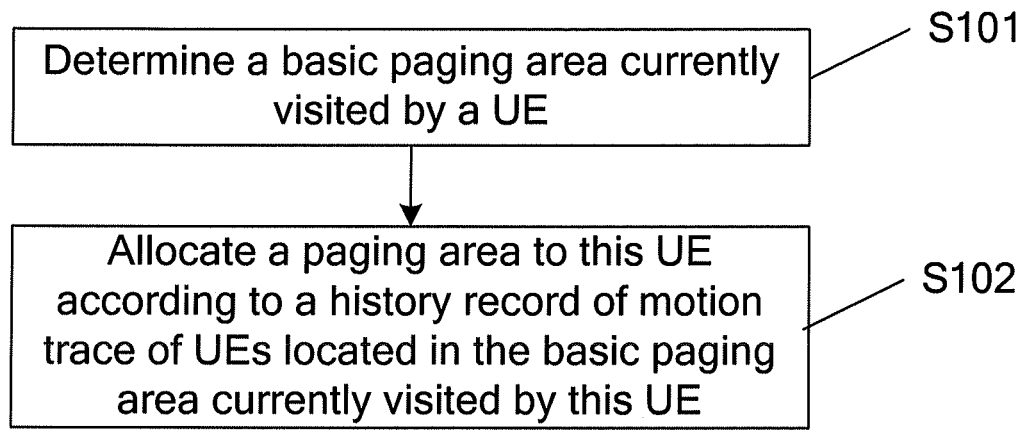
FIG. 1 is a flowchart of a method for allocating paging areas in an embodiment of the present invention.

As shown in FIG. 1, a method for allocating paging areas in an embodiment of the present invention includes the following steps:

Step S101: Determine a basic paging area currently visited by a UE.

Step S102: Allocate a paging area to the UE according to a history record of motion trace of UEs located in the basic paging area currently visited by the UE.

Specifically, the basic paging area currently visited by the UE is determined according to an identifier (ID) of the currently visited basic paging area, where the ID is reported by the UE or a Radio Access Network (RAN).

An operation that accompanies the step of determining the basic paging area currently visited by the UE may be: determining at least one basic paging area visited by the UE before the UE enters the currently visited basic paging area, for example, determining a first basic paging area which is last visited by the UE before the UE enters the currently visited basic paging area, a second basic paging area which is last visited by the UE before the UE enters the first basic paging area, and so on. In this way, a paging area can be allocated to a UE according to a history record of continuous motion trace of multiple UEs located in the basic paging area currently visited by the UE, where the motion trace of the UEs is a trace of the UEs moving from at least one basic paging area previously visited by the UEs to the basic paging area currently visited by the UE and to the basic paging areas subsequently visited by the UEs. A paging area allocated to a UE includes at least the basic paging area currently visited by the UE, and may include at least one basic paging area that tends to be visited by the UEs after the UEs move from the previous motion trace recorded in the history record to the basic paging area currently visited by the UE. Besides, the at least one basic paging area visited by the UEs before the UEs enter the currently visited basic paging area may be determined according to the ID of at least one basic paging area visited by the UEs before the UEs enter the currently visited basic paging area, where the ID is reported by the UEs. If the ID of the at least one basic paging area previously visited by the UEs is the ID of one basic paging area, the ID of one basic paging area is the ID of the first basic paging area last visited by the UEs before the UEs move to the currently visited basic paging area. Based on the history record of continuous motion trace of multiple UEs moving from the previously visited basic paging area to the currently visited basic paging area and to the subsequently visited basic paging areas, the prediction about the potential trace of a UE with the same history trace is more accurate, and more appropriate paging area is generated for the UE.

The contents of the history record depend on the actual needs so long as the history record reflects the motion trace of multiple UEs. For example, the history record may include information indicating how many times the UEs in the currently visited basic paging area move to other basic paging areas in each unit of time within a specific period. The history record may include: actual number of motions of the UEs from the basic paging area currently visited by the UE to the basic paging areas adjacent to the currently visited basic paging area, or a result obtained after the actual number of motions is divided or multiplied by a scale factor. More specifically, if the scale factor is less than 1, the actual number of motions corresponding to the adjacent basic paging areas inside the paging area is divided by the scale factor, where the paging area is allocated to the UEs located in the currently visited basic paging area or the actual number of motions corresponding to the adjacent basic paging areas outside the paging area is multiplied by the scale factor, where the paging area is allocated to the UEs located in the currently visited basic paging area.

The motion trace of the UEs in the history record may be motion trace of multiple UEs. In practice, however, it is appropriate to record the motion trace of the UEs with a sampling flag. In the statistic period, the paging area allocated to the sampled UEs may include only the basic paging area currently visited by the sampled UEs in order to obtain data of continuous motion of the sampled UEs between basic paging areas.

The history record may be a combination of multiple history records, each being maintained in a different time segment.

If the UE is static or moves only in the currently visited basic paging area in a specific time segment such as a time length of periodic location update, the ID of the at least one basic paging area visited previously may be the ID of the currently visited basic paging area.

If the history record shows that the UEs located in the currently visited basic paging area will most probably stay inside the currently visited basic paging area subsequently, the paging area allocated to the UE may include fewer basic paging areas, for example, include only the basic paging area currently visited by the UE. Further, the paging area allocated to the UE may include the basic paging area which will be most probably visited by the UEs located in the basic paging area currently visited by the UE among the basic paging areas adjacent to the currently visited basic paging area. The number of basic paging areas included in the paging area allocated to the UE located in the currently visited basic paging area is less than the number of basic paging areas included in the paging area allocated to the UE located in a different basic paging area which will be most probably visited by the UE.

Besides, the number of basic paging areas included in the paging area allocated to the UE depends on at least one of these factors: time segment, user type, user property, property of the basic paging area, and motion speed of the UE.

The paging area allocated to the UE may include multiple continuous adjacent basic paging areas. The multiple continuous adjacent basic paging areas are a result of prediction performed according to the history record and the trace of motion of the UE between the multiple continuous adjacent basic paging areas. In the history record, the UE located in a basic paging area on the motion trace will more probably move to the next adjacent basic paging area on the motion trace than move to other basic paging areas. In the history record, after the UE moves from a previous adjacent basic paging area to a basic paging area on the motion trace, the UE will more probably move from this basic paging area to the next adjacent basic paging area on the motion trace than move to other basic paging areas.

The number of multiple continuous basic paging areas on the motion trace depends on at least one of these factors: user type, property of basic paging area, time segment, and motion speed of the UE.

The paging area may be allocated to the UE according to preset parameters. The preset parameters may be: an upper threshold of basic paging areas included in a paging area; or a threshold of a sum of probabilities of the UEs moving from the currently visited basic paging area to all adjacent basic paging areas in the paging area; or both of them.

A recent motion frequency corresponding to a specific paging area included in the paging area allocated to a UE may reach or exceed a preset threshold of the recent motion frequency. The recent motion frequency corresponding to a specific basic paging area refers to how many times a UE moves from a currently visited basic paging area to the specific basic paging area in a recent period; or refers to how many times a UE, which has moved from a previous basic paging area to the currently visited basic paging area, moves to the specific basic paging area in a recent period.

The steps in the foregoing method embodiment and the step of generating and maintaining the history record may be implemented by the same network entity; or, the steps in the foregoing method embodiment are implemented by one network entity, and the step of generating and maintaining the history record is implemented by another network entity. For example, supposing that the previous method embodiment is applied to an EPS, a Mobility Management Entity (MME) may be responsible for determining the basic paging area currently visited by the UE, allocating a paging area to the UE, and generating and maintaining the history record; or, an MME is responsible for determining the basic paging area currently visited by the UE and allocating a paging area to the UE, and a central node is responsible for generating and maintaining the history record. One or more MMEs may report the motion trace of the UE to the central node, and the central node creates or updates the record according to the reported motion trace. As required by the MME, or when decided as necessary by the central node, or upon expiry of the set period, the central node may submit the result of analyzing the history record to the MME. The motion trace reported by the MME to the central node may be statistic data in a specific period. The central node may inform the MME of the paging area corresponding to the basic paging area, for example, when the MME is restarted but the MME stores no history record of motion of the UE. Further, the central node may analyze the statistic data reported by the MME, obtain the updated paging area corresponding to the basic paging area, and submit the analysis result to the MME periodically. When the MME needs to allocate a paging area corresponding to a basic paging area to the UE, the MME may allocate the paging area submitted by the central node to the UE directly.

Figure 2:
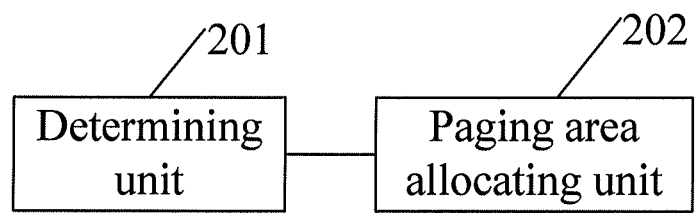
FIG. 2 shows a structure of an apparatus for allocating paging areas in an embodiment of the present invention.

The foregoing method embodiment may be implemented by different apparatuses. As shown in FIG. 2, one of the apparatuses for allocating paging areas includes:

a determining unit 201, adapted to determine a basic paging area currently visited by a UE; and a paging area allocating unit 202, adapted to allocate a paging area to this UE according to a history record of motion trace of UEs located in the basic paging area determined by the determining unit 201.

Specifically, the determining unit 201 may determine the basic paging area currently visited by the UE according to the ID of the currently visited basic paging area, where the ID is reported by the UE or RAN.

At the same time of determining the basic paging area currently visited by the UE, the determining unit 201 may determine at least one basic paging area visited by the UE before the UE enters the currently visited basic paging area, for example, determine a first basic paging area which is last visited by the UE before the UE enters the currently visited basic paging area, a second basic paging area which is last visited by the UE before the UE enters the first basic paging area, and so on. In this way, the paging area allocating unit 202 can allocate a paging area to a UE according to a history record of continuous motion trace of multiple UEs located in the basic paging area currently visited by the UE, where the motion trace of the UEs is a trace of the UEs moving from at least one basic paging area previously visited by the UEs to the basic paging area currently visited by the UE and to at least one basic paging area subsequently visited by the UEs. A paging area allocated to a UE includes at least the basic paging area currently visited by the UE, and may include at least one basic paging area that tends to be visited by the UEs after the UEs move from the previous motion trace recorded in the history record to the basic paging area currently visited by the UE. Also, the determining unit 201 may determine at least one basic paging area visited by the UEs before the UEs enter the currently visited basic paging area according to the ID of at least one basic paging area visited by the UEs before the UEs enter the currently visited basic paging area, where the ID is reported by the UEs.

The motion trace of the UEs in the history record may be motion trace of multiple UEs. In practice, however, it is appropriate to record the motion trace of the UEs with a sampling flag. During the sampling operation for the motion of a UE, the paging area allocated by the paging area allocating unit 202 to the sampled UEs includes only the basic paging area currently visited by the sampled UEs in order to obtain data of continuous motion of the sampled UEs between basic paging areas.

If the history record shows that the UEs located in the currently visited basic paging area will most probably move inside the currently visited basic paging area subsequently, the paging area allocated by the paging area allocating unit 202 to the UE may include fewer basic paging areas, for example, include only the basic paging area currently visited by the UE. Further, the paging area allocated to the UE may include the basic paging area which will be most probably visited by the UEs located in the basic paging area currently visited by the UE among the basic paging areas adjacent to the currently visited basic paging area.

The units in the foregoing apparatus may be set as or applied in the MME of the EPS, and the working mode of such units in the MME is the same as the working mode in the foregoing apparatus.

To help those skilled in the art better understand the present invention, the following gives several embodiments of the present invention. In the following embodiments, the network environment is an EPS, "TA" is the basic paging area mentioned above, and "TA list" is the paging area allocated to the UE.

Figure 3:
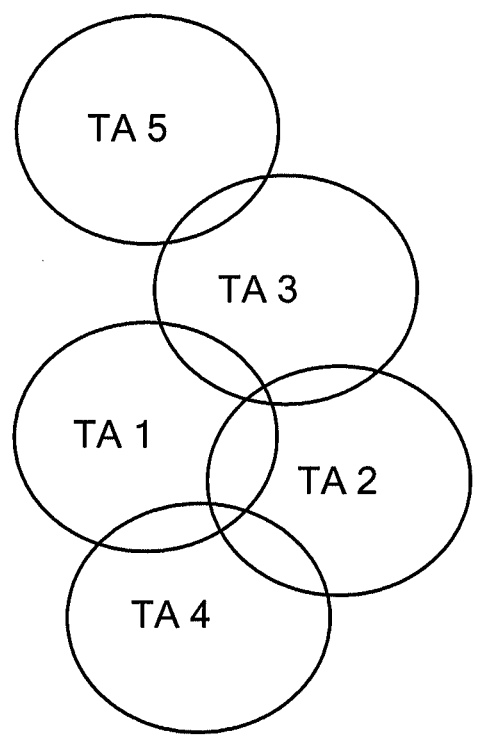
FIG. 3 shows an application scenario of a first embodiment of present invention.

FIG. 3 shows an application scenario of a first embodiment of present invention. In this embodiment, TA1, TA2, and TA4 are adjacent to each other; TA1, TA2, and TA3 are adjacent to each other; and TA3 is adjacent to TA5.

Figure 4:
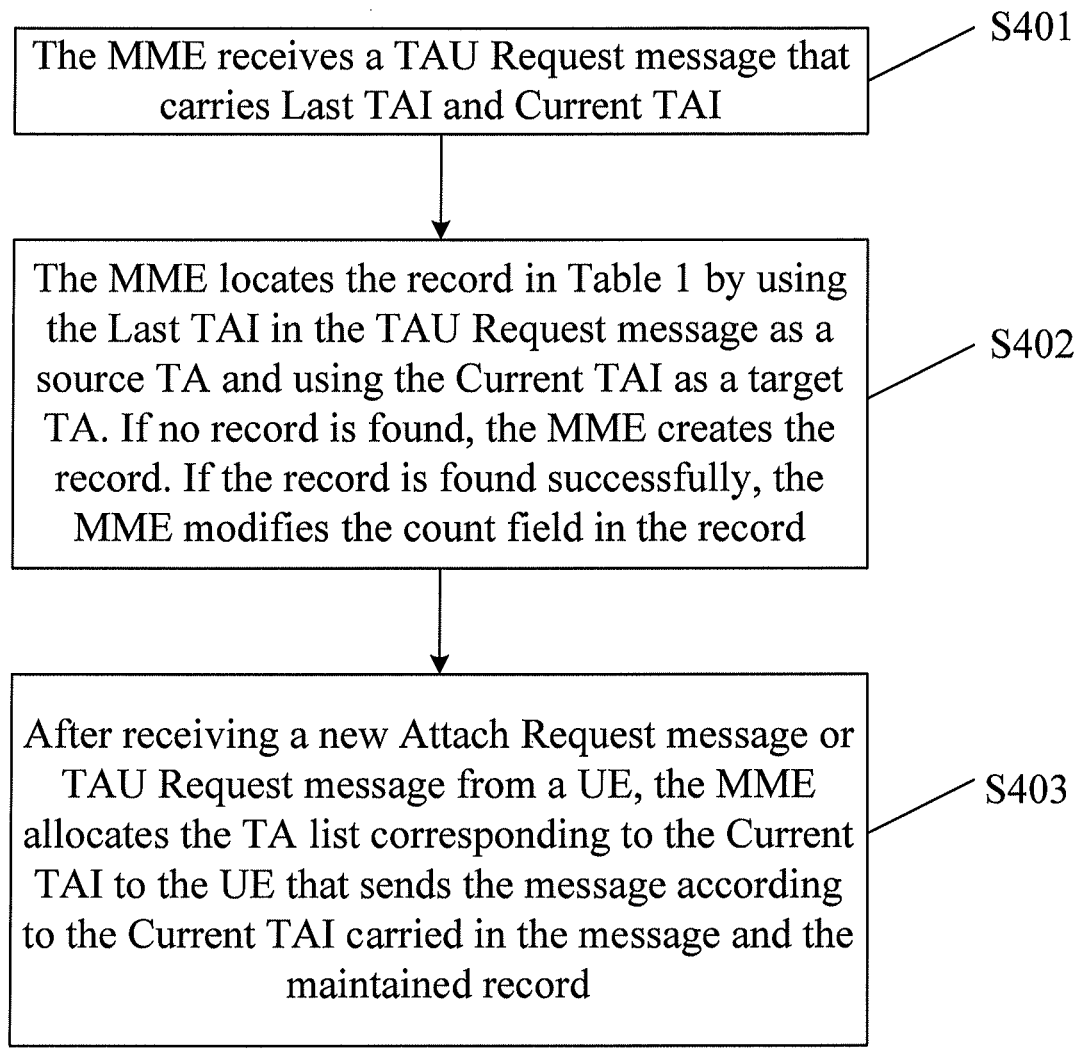
FIG. 4 is a method flowchart of a first embodiment of the present invention.

As shown in FIG. 4, the method in the first embodiment includes the following steps:

Step S401: The MME receives a Tracking Area Update (TAU) Request message that carries a Last TAI and a Current TAI. The Last TAI (also known as Last Visited TAI) is an ID of the last TA visited by the UE before the UE enters the current TA; and the Current TAI is an ID of the TA currently visited by the UE.

Step S402: The MME locates the record in Table 1 by using the Last TAI in the TAU Request message as a source TA and using the Current TAI as a target TA. If no record is found, the MME creates the record. If the record is found successfully, the MME modifies the count field in the record. As a way of modifying the count field, the MME may add 1 to the counter, or perform a weighting operation according to the property of the user of the UE, target TA, and time segment, namely, add a weighted value to the existing count. For example, for a TAU initiated by a VIP user, the count increases by 1.2; for a TAU initiated by an ordinary user, the count increases by 1; for a TAU initiated in rush hours, the count increases by 1.2; for a TAU initiated in ordinary time segments, the count increases by 1.

TABLE 1

| Source TA | Target TA | Count | Is target TA in current preferred TA list? | Count after a scale factor (0.6) is applied | Percent | Percent order | Recent motion frequency (number of times per second, last 10 minutes) |
|---|---|---|---|---|---|---|---|
| TA1 | TA1 | 500 | Yes | 500 | 51.0% | 1 | 7.9 |
| TA1 | TA2 | 50 | No | 30 | 3.1% | 4 | 2.0 |
| TA1 | TA3 | 300 | Yes | 300 | 30.6% | 2 | 5.3 |
| TA1 | TA4 | 150 | Yes | 150 | 15.3% | 3 | 2.5 |
| TA3 | TA1 | 700 | Yes | 700 | 35% | 1 | 8.3 |
| TA3 | TA2 | 200 | Yes | 200 | 10% | 4 | 3.0 |
| TA3 | TA3 | 650 | Yes | 650 | 32.5% | 2 | 5.1 |
| TA3 | TA5 | 450 | Yes | 450 | 22.5% | 3 | 3.5 |

As shown in Table 1, a record includes these fields: Source TA, Target TA, Count, Is target TA in current preferred TA List, Count after a scale factor is applied, Percent, Percent order, and Recent motion frequency. Each record uses the source TA plus the target TA as an index. "Count" measures how many times a UE or UEs move from the source TA to the target TA within the current statistic period. "Is target TA in current preferred TA list" indicates whether the TA list allocated to the UE includes the target TA when the MME allocates the TA list to the UE in the source TA after analyzing the data in the history record. In practice, the MME may analyze the latest data in the history record at intervals such as 10 minutes, and update the TA included in the TA list for a source TA. "Count after a scale factor is applied" will be interpreted below. "Percent" is a ratio of a first count to a second count, where the first count is a result of multiplying a scale factor by each record in a set of records with the same source TA value in Table 1, and the second count is a total count of multiplying the scale factor by all records in the set of records. "Recent motion frequency" refers to the number of motions of the UE from the source TA to the target TA within a recent period, and is measured in number of times per second. The statistic period of "Recent motion frequency" is not necessarily equal to, but may be shorter than, the statistic period of the number of motions from the source TA to the target TA.

Table 1 is only an example. In practice, the content of the table depends on the actual needs. For example, "Count" does not necessarily coexist with "Count after a scale factor is applied".

The MME calculates and refreshes the percent of motions from a source TA to each target TA in real time or periodically, and ranks the motions according to the percent. The percent in the statistics reflects the probability of the UE moving from a source TA to each target TA. The MME may also calculate the frequency of moving from the source TA to the target TA recently (such as in the last 10 minutes).

Taking the first four records in Table 1 as an example, the MME receives and counts 1000 TAU Request messages in which the Last TAI is the ID of TA1. In such TAU Request messages, there are 500 TAU Request messages in which the target TA is still TA1, ranking number 1; there are 300 TAU Request messages in which the target TA is TA3, ranking number 2; there are 150 TAU Request messages in which the target TA is TA4, ranking number 3; and there are 50 TAU Request messages in which the target TA is TA2, ranking number 4.

Nevertheless, the four records do not mean that the adjacent TAs of TA1 are TA2, TA3 and TA4 only. TA1 may have other adjacent TAs, but no motion of the UE from TA1 to the adjacent TA has been statisticized for reasons such as communication lines, and the MME keeps no record of motion from TA1 to the adjacent TAs.

It should be noted that the TA currently visited by the UE is necessarily included in the allocated TA list. In this way, when the MME ranks the records in percentage, the MME does not necessarily calculate or rank the percents for the records whose target TA is the source TA, but calculates and ranks the records in percentage, where target TA in the record is not the source TA.

Step S403 occurs after step S402: After receiving a new Attach Request message or TAU Request message from a UE, the MME finds a TA to which the UE will most probably move from the TA identified by the Current TAI carried in the message, adds the found TA into the TA list, and allocates the TA list to the UE that sends the message. It should be noted that at the time of allocating a TA list to the UE, the Current TAI corresponds to the source TA in Table 1 so that it is practicable to determine the TA or TAs to which the UE will most probably move.

Supposing that the Current TAI carried in the Attach Request or TAU Request is the ID of TA1, according to the percent order in Table 1, the MME determines the order of probabilities of being the next TA to be visited by the UE in TA1, and the order from high probability to low probability is: TA1->TA3->TA4->TA2.

The following two parameters may be configured on the MME:

(a) upper threshold of the number of TAs in a TA list

For example, it is stipulated that a TA list can include three TAs at most. If the Current TAI carried in the Attach Request or TAU Request is the ID of TA1, according to the records in Table 1 and the threshold, the MME determines that the TA list allocated to the UE includes TA1, TA3, and TA4.

(b) threshold of the sum of probabilities of the UEs moving from the current TA to all TAs in the TA list For example, the set threshold is 80%. If the Current TAI carried in the Attach Request or TAU Request is the ID of TA1, according to the records in Table 1 and the threshold, the MME determines that the sum of the probabilities of moving from TA1 to TA1, TA3, and TA4 is 81.6%, which is greater than 80%. Therefore, the TA list allocated to the UE includes TA1 and TA3.

When the MME allocates a TA list to the UE, (a) and/or (b) above serves as constraint conditions of the allocation.

The values of parameters (a) and (b) above are determined according to the actual needs. Specifically, the values of such parameters depend on the user type, TA, time segment, and property or feature of a single user. Here are several examples of setting the parameters:

For the UE that involves few calls and short messages, the maximum number of TAs allowed in a TA list may be a large value, and the primary purpose is to control the amount of location update signaling;

for the UE that moves along a road, the maximum number of TAs allowed in a TA list may be a large value, and the primary purpose is to control the amount of location update signaling;

in rush hours, the maximum number of TAs allowed in a TA list may be a large value, and the primary purpose is to control the amount of location update signaling; and for the UE that moves at a high speed, the maximum number of TAs allowed in a TA list may be a large value, and the primary purpose is to control the amount of location update signaling. The MME may judge the motion speed of the UE according to the frequency of the UE sending ordinary TAU Request messages (namely, not the TAU Request messages sent periodically) continuously in a unit of time. For example, the UE sends an ordinary TAU Request message 4 times per hour, which is greater than the threshold 3 times per hour; but the maximum number of TAs allowed in a TA list for this UE is 6, and therefore, the MME increases the maximum number of TAs allowed in the TA list allocated to the UE, namely, modifies the threshold to 7.

It should be noted that: If the Current TAI carried in the Attach Request or TAU Request is the ID of TA1 and the MME determines that the UE will most probably move from TA1 to TA3 and TA4, the MME always lets the TA list include TA3 and TA4 when the UE initiates the TAU by using TA1 as the current TA. No TAU is initiated (except periodical TAU) when the UE moves between TAs in the TA list. Therefore, the number of sent TAU Request messages will be relatively small when the UE moves from TA1 to TA3 and TA4 subsequently. In this way, the percent of the UE moving to the less probable TA (such as TA2) will rise relatively. After a while, it is possible that the percent of motion from TA1 to TA2 ranks higher, and the MME determines that the UE will more probably move from TA1 to TA2 than TA4. The percent of motion to TA4 ranks third previously. When the UE initiates TAU by using TA1 as the current TA, the MME may add TA2 into the TA list. In fact, the number of TAU Request messages between TA3 and TA4 will decrease. That is, the number of TAU Request messages between all adjacent TAs in the TA list will decrease. In other words, the percent order of the frequency of moving from a TA to other TAs may be unstable.

For such problems, two corrective solutions are put forward herein:

(u) A "recent motion frequency" field is introduced in Table 1. The "recent motion frequency" refers to frequency of moving from one TA to another in a recent period. A threshold of the recent motion frequency may be set. The MME adds the target TA corresponding to the recent motion frequency into the current preferred TA list only if a recent motion frequency reaches or exceeds the threshold. For example, it is assumed that the threshold is 3 times per second and the Current TAI carried in the Attach Request or TAU Request is the ID of TA1. When the MME allocates the TA list to the UE, because the UE in TA1 moves to TA1 and TA3 at a frequency of more than 3 times per second in the recent period, but the UE moves to TA2 and TA4 at a frequency of less than 3 times per second in the recent period, the MME adds TA1 and TA3 into the TA list, but does not add TA2 or TA4 into the TA list. Further, if a recent motion frequency is less than the threshold, the MME may ignore the record of the recent motion frequency in calculating or ranking the percent.

After a target TA is added into the preferred TA list of a source TA, the record of motion from the source TA to the target TA is no longer restricted by the motion frequency threshold. That is, when the MME finds that the recent motion frequency of moving from the source TA to the target TA is less than the threshold, the MME does not exclude the target TA from the preferred TA list, but still applies the target TA in calculating and ranking the percent, and the target TA may be ranked last and excluded from the preferred TA list of the source TA. In this case, the record of motion from the source TA to the target TA is restricted by the recent motion frequency again.

The statistic period of the recent motion frequency may be short, and may be different from the refresh period of other data in the record.

(v) At the time of ranking the percents, for the records whose target TA is outside the current preferred TA list corresponding to the source TA, the value of the "count" field may be multiplied by a scale factor p, and then the percent is calculated and ranked together with other records. The scale factor p may be obtained in this way: In the same comparable statistic period, after a target TA is added into a TA list, the MME calculates the ratio of the "number of TAU Request messages from the source TA corresponding to the TA list to the target TA" to the number counted before the target TA is added into the TA list, and the ratio is the scale factor p. The scale factor p may be configured empirically, and adjusted and optimized on an ongoing basis. In Table 1, the scale factor p is 0.6 fixedly. Nevertheless, the scale factor p may be generated dynamically according to the statistic result on the MME. The scale factor p may be a globally uniform value, or a value that varies with region, time segment, source TA, and target TA.

Nevertheless, if the count corresponding to the target TA not added into the TA list is not multiplied by the scale factor p, the count corresponding to the target TA added into the TA list may be divided by the scale factor p.

Besides, solution (u) and solution (v) may be applied simultaneously or separately.

According to the protocol, if an idle UE does not move out of the current paging area within a specific time segment and a location update procedure is triggered, the UE needs to initiate a special location update procedure, namely, periodical location update procedure, to notify the current location of the UE to the network and keep synchronization between the UE and the network. In an EPS, the periodical location update procedure is a periodical TAU procedure. If the MME finds that the UE in a source TA moves to the source TA at a higher percent according to the TAU Request messages sent by the UE, it indicates that the users in the source TA primarily stay static or move within the source TA, for example, within a residential area or office premises. In this way, the MME may allocate a TA list that includes fewer TAs to the UE in such a TA in order to save overhead. Such statistic characteristics may vary with time. For example, the statistic characteristics of a TA in rush hours are different from those in ordinary time segments.

In the prior art, the Last TAI is defined as the TA visited by the UE before the UE enters the current TA, and always different from the current TA. Therefore, the MME is unable to know whether the UE stays on the current TA in a long time according to the periodical route update message. In order to optimize the allocation of the TA list when the UE is static, the embodiments of the present invention put forward a method for setting Last TAI. For example, when the UE confirms that the UE has stayed in a TA for a period longer than a threshold, the UE sets the Last TAI to the ID of the current TA when initiating periodical route update. Specifically, the Last TAI may be set in the following way:

The UE sets the stored Last TAI value to the ID of the TA currently visited by the UE at the time of getting attached;

The UE updates the Last TAI to the ID of the current TA when the UE moves from the current TA to another TA;

The UE sets the stored Last TAI value to the ID of the current TA whenever the UE performs the periodical TAU; or the UE sets the Last TAI to the ID of the current TA only if the UE does not move from the current TA to another TA within N continuous times of periodical TAU, where the value of N may be configured on the UE or delivered from the network.

In the TAU Request message sent in the TAU procedure, the UE always sets the Last TAI in the message to the Last TAI value currently stored by the UE.

When the probability of multiple UEs in a TA moving to the TA reaches or exceeds a preset threshold, the MME determines that the UE generally keeps static within this TA (for example, the TA covers office premises). Therefore, the MME may decrease the TAs included in the TA list appropriately when allocating a TA list to the UE in this TA.

To further optimize the process of generating the TA list, the MME may perform forward search in the history record of the motion trace of the UE. Specifically, in the history record, if the subsequent motion trace of the UE in the current TA passes through multiple continuous adjacent TAs, the paging area allocated to the UE includes the multiple continuous adjacent TAs corresponding to the motion trace. For example, according to the four records in Table 1, the MME determines that no UE has moved from TA1 to TA5 directly so far because TA1 is not adjacent to TA5 or because the probability of the UE moving from TA1 to TA5 directly is very low for certain reasons although they are adjacent to each other. It is assumed that, according to filtering conditions, the MME decides to add TA3 into the TA list whose current TA is TA1, but according to the last four records in Table 1, the MME determines that the UE in TA3 will more probably move to TA5, and therefore, the MME also adds TA5 into the TA list. In this way, if the MME moves from TA1 to TA3, and then moves from TA3 to TA5, the MME will initiate no TAU, thus saving the signaling. Here, TA1, TA3 and TA5 are called "three continuous adjacent TAs".

Supposing that the UE is currently located in TA1, the approximate probability of the UE moving from TA1 to TA2, TA3 . . . $TA_{N-1}$, and finally to $TA_N$ is:

$$P_N = P_{1\#2} * P_{2\#3} * \ldots * P_{N-2\#N-1} * P_{N-1\#N}$$

In the formula above, $P_{M\#N}$ is a ratio of the count of motions from $TA_M$ to $TA_N$ in Table 1 to the total count of motions from $TA_M$ to all adjacent TAs.

The depth of the forward search performed by the MME is generally 1-5. Specifically, the depth can be configured according to the type of user, TA, time segment, and motion speed of the UE. Generally, a greater depth of forward search may be applied to the UE that moves quickly. For example, the current ordinary TAU frequency counted for a UE is 4 times per hour, which exceeds the frequency threshold 3 times per hour; and the forward search depth set for the UE is 3. Therefore, the MME may increase the forward search depth of the UE by 1, and to 4.

In the forward search process, the search depth is limited to the maximum number of TAs included in the TA list allocated to the UE. Meanwhile, for every step of search on the path of forward search, adding a new adjacent TA into the TA list is controlled by a minimum value of the sum of probabilities of moving from the current TA to an adjacent TA in every step of search, where the adjacent TA is a TA adjacent to the current TA in the newly accessed TA list. That is, the minimum value of the sum of probabilities is applicable to every step of search. The sum of probabilities may vary with the search depth. For example, in a forward search from TA1 currently visited by the UE, in the first step of search, the adjacent TAs whose motion probability is not less than 80% are added into the TA list. Supposing that TA3 and TA4 are added into the TA list, the next step of search is performed for one of the motion traces (such as TA3), and the adjacent TAs whose motion probability is not less than 70% are added into the TA list.

The MME may perform forward search for multiple possible subsequent motion traces of the UE according to the information in the history record. For example, in the foregoing search process, search may be performed along two paths: TA1->TA3, and TA1->TA4.

In certain circumstances, several TAs may form a loop. On this loop, the MME may return to the start point after performing forward search for several times. Therefore, the MME should check whether such circumstances occur on a path in the forward search, and terminate the forward search on the path once they occur.

In this embodiment, step S401 and step S402 deal with the method of maintaining the history record of the motion trace of the UE according to the information in the TAU Request message; step S403 deals with the method of allocating a TA list to the UE currently located in a TA according to the maintained history record. In fact, step S401, step S402, and step S403 are not totally separated from each other. In practice, when the MME receives a TAU Request message in step S401 and step S402, a TA list needs to be allocated to the UE according to the maintained history record; when the MME allocates a TA list to a UE in step S403, the MME also maintains and updates the history record of the motion trace of the UE according to the Last TAI and Current TAI in the TAU Request message. Step S401 and S402 are one aspect of the procedure, and step S403 is the other aspect of the same procedure. In this embodiment, the three steps are described separately in order to make the description concise.

It should be noted that the MME may maintain the history record in the same way. Specifically, the MME uses a certain proportion of the UEs as samples randomly. For each sampled UE, the MME always puts only the TA currently visited by the sampled UE into the corresponding TA list in the sampling process. More specifically, in the sampling process, the MME puts only the TA currently visited by a sampled UE into the TA list allocated to the sampled UE whenever the MME allocates a TA list to the sampled UE. All the sampled UEs initiate a TAU procedure whenever they move out of the current TA. The MME may record the continuous trace of motion of the sampled UEs between the TAs. For example, when a UE enters TA1, the MME determines the UE as a sampled UE randomly, and the TA list allocated to the sampled UE includes only TA1. After the sampled UE moves from TA1 to TA2, the sampled UE sends a TAU Request message that carries a Last TAI and a Current TAI, where the Last TAI is the ID of TA1, and the Current TAI is the ID of TA2. The MME determines that the sampled UE has moved from TA1 to TA2 according to the TAU Request message reported by the UE.

In practice, the MME may maintain different motion trace history record tables for different time segments. For example, the MME maintain a history record for each of these time segments: 7:00-9:00 a.m. (punch-in rush hours), 9:00-15:00 (usual time), and 17:00-19:00 (punch-out rush hours); or the MME maintains a history record for each of these days: Monday to Friday (working days), and Saturday and Sunday (weekends); or the MME combines such history records when allocating a TA list to the UE, namely, allocates a TA list to the UE according to the combined history record.

As mentioned above, the MME may report the statistic information to a central node, and the central node analyzes the data and delivers the preferred TA list of each current TA to the MME in different scenarios (such as different time segments and different user types). The central node may obtain statistic information from multiple MMEs, analyze them together, and delivers the analysis result to each MME. The analysis method employed the central node is the same as the analysis method employed the MME in this embodiment. In the embodiments to be described below, the central node may also be used to put data together, analyze the data, and deliver the analysis result, which will not be repeated any further.

The following describes the second embodiment.

Figure 5:
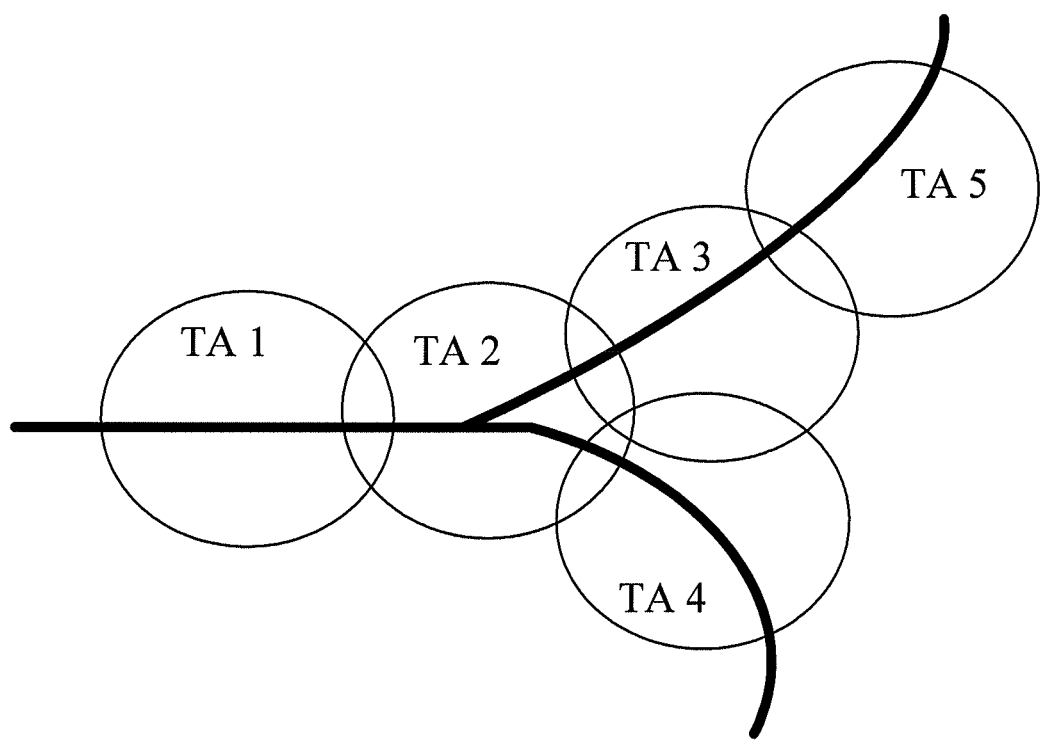
FIG. 5 shows an application scenario of a second embodiment of present invention.

FIG. 5 shows the application scenario of the second embodiment. Supposing that the lines in the illustration indicate roads, the line from TA2 to TA3 is one branch of the road, and the line from TA2 to TA4 is the other branch. As shown in FIG. 5, if the vehicles from TA3 or TA4 to TA2 need to move further, the vehicles can only travel along the road to TA1 (supposing that the traffic rule does not allow a vehicle to swerve to TA4 at the intersection after the vehicle travels from TA3 to TA2, and does not allow a vehicle to swerve to TA3 at the intersection after the vehicle travels from TA4 to TA2). If a vehicle that travels from TA1 to TA2 needs to run further, the vehicle may enter TA3 or TA4. If the method in the first embodiment is applied, the statistic result shows that the UE moves from TA2 to these TAs most frequently: TA1, TA3, and TA4. Therefore, when the TA currently visited by the UE is TA2, the MME puts TA1, TA2, TA3, and TA4 into the TA list allocated to the UE. In fact, if the UE moves from TA3 into TA2, because it is probable that the UE will enter TA1 and it is scarcely possible that the UE will swerve to TA4 or turn back to TA3, futile paging overhead will occur if TA3 or TA4 is still included in the TA list in such circumstances.

As revealed in FIG. 5, the UE moving from which TA into the current TA is a factor for deciding the target TA to which the UE will most likely enter. Considering such a factor, this embodiment puts forward the following two solutions:

(x) When the UE sends a TAU Request message, the TAU Request message carries a Last TAI and a Last2 TAI. The Last2 TAI is the ID of the TA visited by the UE before the UE enters the TA corresponding to the Last TAI, namely, the Last2 TAI indicates the TA from which the UE enters the TA corresponding to the Last TAI.

(y) The MME uses a certain proportion of the UEs as samples randomly. For each sampled UE, the MME always puts only the TA currently visited by the sampled UE into the corresponding TA list in the sampling process. More specifically, in the sampling process, the MME puts only the TA currently visited by a sampled UE into the TA list allocated to the sampled UE whenever the MME allocates a TA list to the sampled UE. All the sampled UEs initiate a TAU procedure whenever they move out of the current TA. The MME may record the continuous trace of motion of the sampled UEs between the TAs. For example, when a sampled UE enters TA1, the TA list allocated by the MME to the sampled UE includes only TA1. After the sampled UE moves from TA1 to TA2, the sampled UE sends a TAU Request message that carries a Last TAI and a Current TAI, where the Last TAI is the ID of TA1, and the Current TAI is the ID of TA2. The TA list reallocated by the MME to the sampled UE includes only TA2. After the sampled UE moves from TA2 to TA3, the sampled UE sends a TAU Request message that carries a Last TAI and a Current TAI again, where the Last TAI is the ID of TA2, and the Current TAI is the ID of TA3. According to the motion trace of the UE between the TAs, the MME determines that the sampled UE has moved to TA3 after the sampled UE moves from TA1 to TA2.

Solution (1) brings the same effect as solution (2) above.

The second embodiment is based on solution (x), and solution (y) will be detailed in the fifth embodiment later.

Figure 6:
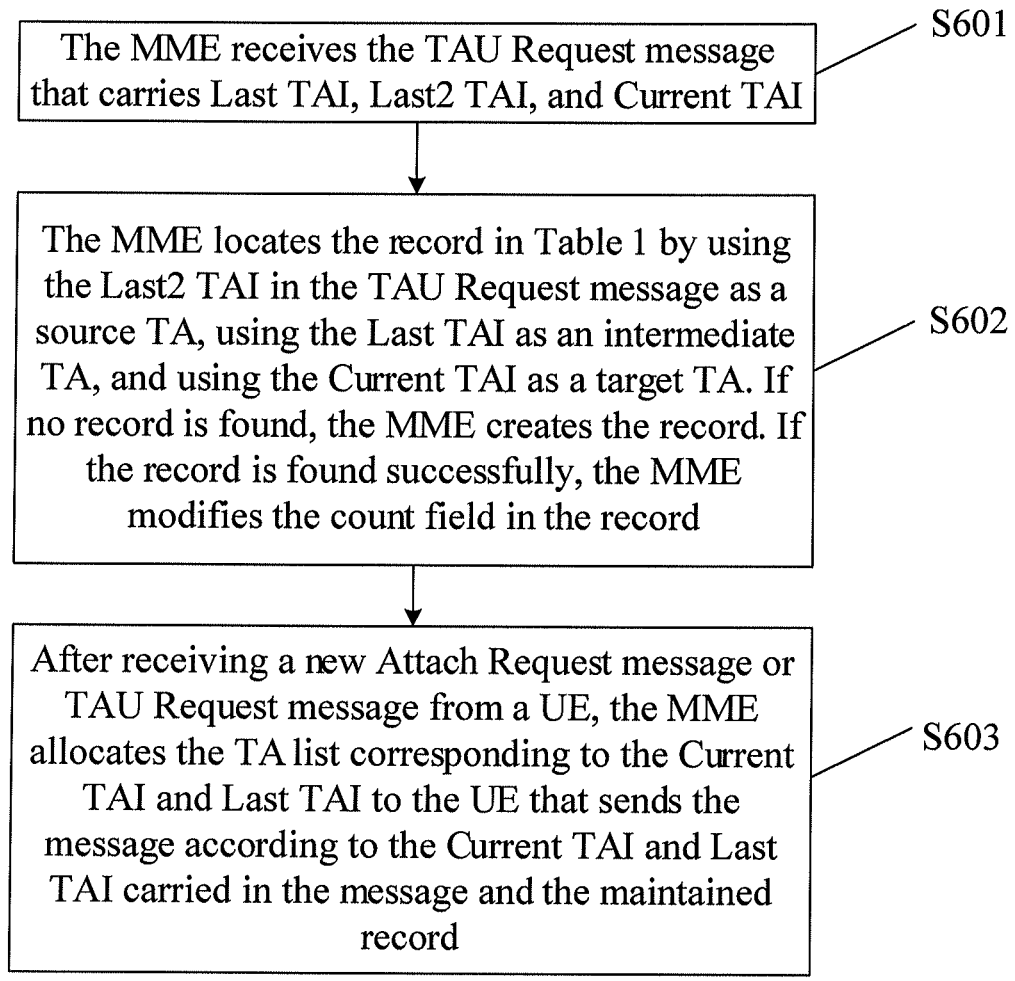
FIG. 6 is a method flowchart of a second embodiment of the present invention.

As shown in FIG. 6, the method in the second embodiment includes the following steps:

Step S601: The MME receives a TAU Request message. The TAU Request message carries Last TAI, Last2 TAI, and Current TAI. The meanings of Last TAI, Last2 TAI, and Current TAI have been described above.

Step S602: The MME locates the record in Table 1 by using the Last2 TAI in the TAU Request message as a source TA, using the Last TAI as an intermediate TA, and using the Current TAI as a target TA. If no record is found, the MME creates the record. If the record is found successfully, the MME modifies the count field in the record. As a way of modifying the count field, the MME may add 1 to the counter, or perform a weighting operation according to the property of the user of the UE, target TA, and time segment, namely, add a weighted value to the existing count.

TABLE 2

| Source TA | Intermediate TA | Target TA | Count | Is target TA in current preferred TA list? | Count after a scale factor (0.6) is applied | Percent | Percent order | Recent motion frequency (number of times per second, last 10 minutes) |
|---|---|---|---|---|---|---|---|---|
| TA1 | TA2 | TA1 | 10 | No | 6 | NA*1 | NA | 0.5 |
| TA1 | TA2 | TA2 | 40 | NA | NA | NA*2 | NA | 2.1 |
| TA1 | TA2 | TA3 | 850 | Yes | 850 | 93.4% | 1 | 10 |
| TA1 | TA2 | TA4 | 100 | No | 60 | 6.6% | 2 | 5.7 |
| TA3 | TA2 | TA2 | 100 | NA | NA | NA*2 | NA | 2.5 |
| TA3 | TA2 | TA1 | 1400 | Yes | 1400 | 100% | 1 | 15.4 |
| TA2 | TA3 | TA3 | 300 | NA | NA | NA*2 | NA | 6.4 |
| TA2 | TA3 | TA5 | 700 | Yes | 700 | 100% | 1 | 12.5 |

*1In this record, because the recent motion frequency is lower than the threshold, it is excluded from the factors for calculating and ranking the percents in this embodiment.
*2In this embodiment, the records whose target TA is the current TA are not involved in calculating or ranking the percents.

The MME calculates and refreshes the percent of motions from the same source TA and intermediate TA to each target TA in real time or periodically, and ranks the motions according to the percent.

Taking the first four records in Table 2 as an example, the MME receives and counts 1000 TAU Request messages, in which the Last2 TAI is the ID of TA1 and the Last TAI is the ID of TA2. In such messages, there are 10 TAU Request messages in which the target TA is still TA1; there are 40 TAU Request messages in which the target TA is TA2; the TAU Request messages using TA3 as the target TA are more than the TAU Request messages using TA4 as the target TA. That is, among the UEs that moves from TA1 to TA2, a majority of them enter TA3, and a minority of them enter TA4.

The fifth record and the sixth record in Table 2 are statistics of 1500 TAU Request messages in which the Last2 TAI is the ID of TA3, and the Last TAI is the ID of TA2.

The last two records in Table 2 are statistics of 1000 TAU Request messages, in which the Last2 TAI is the ID of TA2 and the Last TAI is the ID of TA3. It should be noted that after the UE moves from TA2 to TA3, the counted frequency of the UEs moving to TA3 is relatively high. One possible reason is that: A rest area exists in TA3, and the vehicle that carries UE stays in the rest area for a long time, and multiple periodical TAU procedures occur in TA3.

Table 2 is only an example. In practice, the content of the table depends on the actual needs. For example, "Count" does not necessarily coexist with "Count after a scale factor is applied".

Step S603 occurs after step S602: After receiving a new Attach Request message or TAU Request message from a UE, the MME allocates the TA list corresponding to the Current TAI and the Last TAI to the UE that sends the message according to the Current TAI and Last TAI carried in the message and the maintained record. It should be noted that at the time of allocating a TA list to the UE, the Current TAI corresponds to the intermediate TA in Table 2 and the Last TAI corresponds to the source TA in Table 2 so that it is practicable to determine the TA or TAs to which the UE will most probably move.

Supposing that the Last TAI carried in the Attach Request message or TAU Request message is the ID of TA1 and the Current TAI carried in the message is the ID of TA2, according to the records in Table 2, the MME determines the order of probabilities of being the next TA to be visited by the UE after the UE moves from TA1 to TA2, and the order from high probability to low probability is: TA3->TA4. The records corresponding to TA1 and TA2 are not involved in the ranking of probabilities. TA1 is not involved in the ranking because it does not fulfill the stipulated recent motion frequency threshold; TA2 is not involved in the ranking because it must be included in the TA list. The operation method in this embodiment does not allow such records to participate in the calculation of ranking.

Like the first embodiment, the following three parameters may be configured on the MME:

(a) upper threshold of the number of TAs in a TA list
(b) threshold of the sum of probabilities of the UEs moving from the current TA to all TAs in the TA list
(c) threshold of recent motion frequency When the MME allocates a TA list to the UE, (a), or (b), or (c) above or any combination thereof serves as constraint conditions of the allocation.

Solution (u) and solution (v) in the first embodiment above are also applicable to the second embodiment.

For the fourth record in Table 2, if TA4 is not included in the current preferred TA list allocated to the UEs which move from TA1 to TA2, the statistics show that there are 100 occasions of the UEs moving to TA4 among the UEs which have moved from TA1 to TA2, but the 100 occasions are multiplied by a scale factor 0.6 to obtain only 60 occasions. The 60 occasions and the 850 occasions counted in the third record are incorporated in the calculation and ranking of the percents.

In the second embodiment, "Is target TA in current preferred TA list" indicates whether the TA list allocated to the UE includes the target TA when the MME allocates the TA list to the UE which moves from a specific source to another specific intermediate TA after the data in the history record is analyzed. In practice, the MME may analyze the latest data in the history record at intervals such as 10 minutes, and update the TA included in the TA list for a source TA and a specific intermediate TA.

According to Table 2, among the UEs which have moved from TA1 to TA2, the MME calculates the weighted probabilities of the UEs moving to the target TA, and the order from high probability to low probability is TA3 (93.4%)->TA4 (6.6%). If the configured threshold is 90%, the MME may add only TA3 and TA2 into the TA list; if the configured threshold is 95%, the MME adds TA3, TA4, and TA2 into the TA list.

In order to optimize the allocation of the TA list to the static UEs, a method for setting Last TAI and Last2 TAI is put forward. The setting method enables the MME to determine the relative static state of the UE. The TA list allocated to a relatively static UE may include fewer TAs. Specifically, the Last TAI and Last2 TAI may be set in the following way:

When getting attached, the UE sets the stored Last TAI value and Last2 TAI value to the ID of the TA currently visited by the UE;

When moving from the current TA to another TA, the UE updates the stored Last2 TAI value to the stored Last TAI value, and then updates the stored Last TAI value to the ID of the current TA newly visited by the UE;

While M procedures of TAU occur continuously at intervals, if the TA currently visited by the UE keeps unchanged, the UE sets the Last2 TAI value to the Last TAI value; while N procedures of TAU occur continuously at intervals, if the TA currently visited by the UE keeps unchanged, the UE sets the Last TAI value to the Current TAI value, where M and N may be configured on the UE or delivered by the network. The M counter and the N counter are cleared to 0 only when the current TA of the UE changes; when the M counter and the N counter are both greater than or equal to the set value, the Last TAI and Last2 TAI needs to be updated. As regards whether the Last TAI is updated first or the Last2 TAI is updated first, it depends on the policy on the UE. For example, while Max(M,N) procedures of TAU occur continuously at intervals, if the TA currently visited by the UE keeps unchanged, the Last2 TAI value, the Last TAI value and the Current TAI value carried in the TAU Request message are the same, namely, they are the ID of the TA currently visited by the UE.

According to the statistics, if the MME finds that the UE which has moved from a source TA to an intermediate TA will more probably move to the intermediate TA than other TAs, and, if the probability reaches or exceeds a threshold, the MME determines that the UEs in the intermediate TA generally keep static or move inside the intermediate TA. Therefore, the MME can reduce the TAs included in the TA list to save the paging overhead. It should be noted that: After the UE in the intermediate TA keeps static for a period, the source TA may the intermediate TA.

The forward search described in the first embodiment above is also applicable to the second embodiment. For example, supposing that a UE is currently located in TA2, the MME determines that the UE will probably move to TA3 after the UE moves from TA1 to TA2 according to Table 2, and therefore, the MME adds TA3 into the TA list. Through forward search in Table 2, the MME determines that the UE will more probably move to TA5 after the UE moves from TA2 to TA3, and therefore, the MME adds TA5 into the TA list. For the UE that moves quickly, a greater depth of forward search may be applied.

It should be noted that the MME may maintain the history record in the same way. Specifically, the MME uses a certain proportion of the UEs as samples randomly. For each sampled UE, the MME always puts only the TA currently visited by the sampled UE into the corresponding TA list in the sampling process. More specifically, in the sampling process, the MME puts only the TA currently visited by a sampled UE into the TA list allocated to the sampled UE whenever the MME allocates a TA list to the sampled UE. All the sampled UEs initiate a TAU procedure whenever they move out of the current TA. The MME may record the continuous trace of motion of the sampled UEs between the TAs. For example, when a UE enters TA1, the MME determines the UE as a sampled UE randomly, and the TA list allocated to the sampled UE includes only TA1. After the sampled UE moves from TA1 to TA2, the sampled UE sends a TAU Request message that carries a Last TAI and a Current TAI, where the Last TAI is the ID of TA1, and the Current TAI is the ID of TA2. The TA list reallocated by the MME to the sampled UE includes only TA2. After the sampled UE moves from TA2 to TA3, the sampled UE sends a TAU Request message that carries a Last TAI and a Current TAI again, where the Last TAI is the ID of TA2, and the Current TAI is the ID of TA3. According to the continuous motion trace of the UE between the TAs, the MME determines that the sampled UE has moved to TA3 after the sampled UE moves from TA1 to TA2.

The first embodiment and the second embodiment describe how the MME determines the times that the UE moves between TAs according to all TAU Request messages, and analyze an incidental phenomenon: After several TAs are added into the TA list corresponding to a specific TA, the TAU procedures between two adjacent TAs in such TAs decrease. Such a phenomenon exerts only a slight impact on the ranking stability of few target TAs to which the UE will less probably move from the specific TA. Moreover, the impact may be overcome through method (u) and method (v) described in the first embodiment and the second embodiment, without affecting the practicability of the method for collecting statistics in the first embodiment and the second embodiment. Another method for collecting statistics is put forward herein: The MME counts the times that the UE moves between TAs through sampling. With enough samples, this method for collecting statistics reflects the probability of the UE moving between adjacent TAs accurately, without generating the incidental phenomenon mentioned in the first embodiment and the second embodiment.

Figure 7:
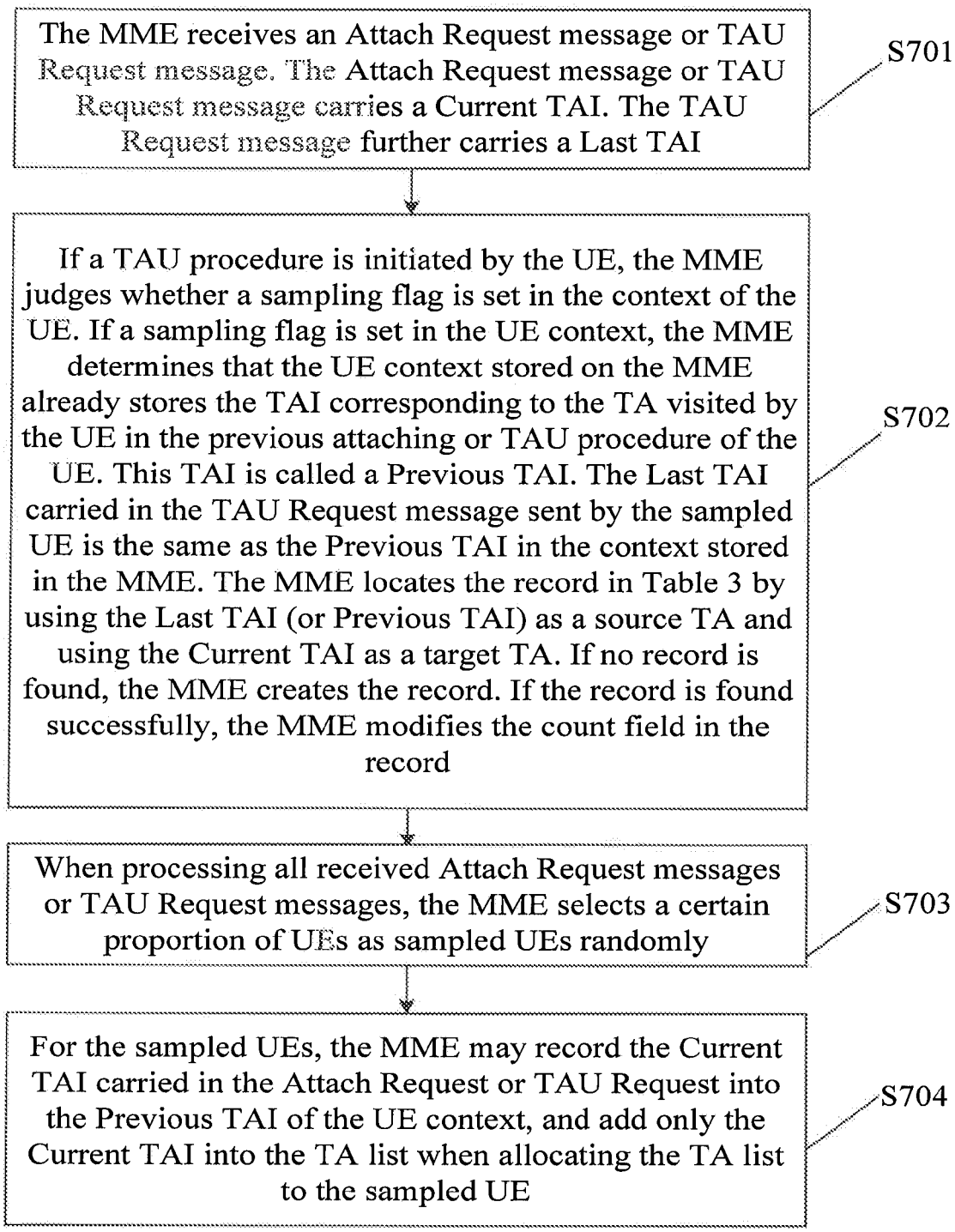
FIG. 7 is a method flowchart of a third embodiment of the present invention.

Therefore, a third embodiment is described below. In the third embodiment, the MME allocates a TA list inclusive of only one TA to the sampled UE selected randomly, and obtains the number of motions of the sampled UEs between two adjacent TAs. As shown in FIG. 7, the method in this embodiment includes the following steps:

Step S701: The MME receives an Attach Request message or TAU Request message. The Attach Request message or TAU Request message carries a Current TAI. The TAU Request message further carries a Last TAI.

Step S702: If a TAU procedure is initiated by the UE, the MME judges whether a sampling flag is set in the context of the UE. If a sampling flag is set in the UE context, the MME determines that the UE context stored on the MME already stores the TAI corresponding to the TA visited by the UE in the previous attaching or TAU procedure of the UE. This TAI is called a Previous TAI. The Last TAI carried in the TAU Request message sent by the sampled UE is the same as the Previous TAI in the context stored in the MME. That is, the MME can determine the TA visited by the UE before the UE enters the current TA according to the Last TAI in the TAU Request message, and save the information about the TA visited by the UE before the UE enters the current TA in the previous attaching or TAU procedure. For more details, see step S704. The MME locates the record in Table 3 by using the Last TAI (or Previous TAI) as a source TA and using the Current TAI as a target TA. If no record is found, the MME creates the record. If the record is found successfully, the MME modifies the count field in the record. As a way of modifying the count field, the MME may add 1 to the counter, or perform a weighting operation according to the property of the user of the UE, target TA, and time segment, namely, add a weighted value to the existing count.

TABLE 3

| Source TA | Target TA | Count | Percent | Percent order | Recent motion frequency (number of times per second, last 10 minutes) |
|---|---|---|---|---|---|
| TA1 | TA1 | 500 | 50% | 1 | 10 |
| TA1 | TA2 | 50 | 5.0% | 4 | 1.1 |
| TA1 | TA3 | 300 | 30.0% | 2 | 5.7 |
| TA1 | TA4 | 150 | 15.0% | 3 | 3.5 |
| TA3 | TA1 | 700 | 35% | 1 | 8.3 |
| TA3 | TA2 | 200 | 10% | 4 | 3.0 |
| TA3 | TA3 | 650 | 32.5% | 2 | 5.1 |
| TA3 | TA5 | 450 | 22.5% | 3 | 3.5 |

Table 3 is only an example. In practice, the content of the table depends on the actual needs. For example, "Count" does not necessarily coexist with "Count after a scale factor is applied".

The MME calculates and refreshes the percent of motions from a source TA to each target TA in real time or periodically, ranks the motions according to the percent, and calculates the recent motion frequency.

In this embodiment, the MME needs only to track two consecutive TAU procedures of the sampled UE, and obtain the information about the motion of the UE from the previous TA (identified by Previous TAI) to the current TA (identified by Current TAI). Therefore, the MME clears the sampling flag in the UE context after processing the TAU Request message of the sampled UE in the way above.

Step S703 occurs after step S702: When processing all received Attach Request messages or TAU Request messages, the MME selects a certain proportion (such as 5%) of UEs as sampled UEs randomly. A sampling flag is affixed into the context of each sampled UE on the MME.

When the MME allocates the TA list, the MME needs to consider only the percent of motions of the UE from a current TA to each target TA. Therefore, for different current TA, the percent of the UE being selected as a sampled UE is not necessarily the same in the Attach procedure or TAU procedure. For example, in a TA with dense population, the percent of the UE being selected as a sampled UE in an attaching procedure or TAU procedure initiated in the TA may be low, for example, 2%; in a TA with sparse population, the percent may be higher, for example, 15%; when the MME is just started and few history records of the motion trace of the UE have been collected, the sampling percent may be high; after the MME runs for a period and the history record includes enough data, the sampling percent may be low, for the purpose of updating the history data. In different time segments, the percent may differ. For example, in rush hours or time segments characterized by crowds of traveling people or frequent TAU procedures, the percent may be low.

Step S704: For the sampled UEs, the MME may record the Current TAI carried in the Attach Request or TAU Request into the Previous TAI of the UE context, and add only the Current TAI into the TA list when allocating the TA list to the sampled UE. The MME may allocate the TA list to the sampled UE by sending an Attach Accept message or TAU Accept message.

For the UE not sampled, according to the Current TAI carried in the Attach Request or TAU Request, the MME searches Table 3 to select the target TAs to which the UE will probably move from the current TA, adds the selected target TAs and the current TA of the UE into the TA list, and allocates the TA list to the UE.

The selection conditions and the selection method in the first embodiment are applicable to the third embodiment except the scale factor. When the sampling-based method for collecting statistics is applied, the TA list allocated to the sampled UE always includes only the TA currently visited by the sampled UE, and only the TAU initiated by the sampled UE exerts impact on the data in Table 3. Therefore, the data in Table 3 keeps stable no matter which TAs are included in the TA list allocated to the UE. Therefore, the scale factor in the first embodiment is not required here.

In the third embodiment, the MME tracks only the motion trace of the sampled UE in a TAU period, and obtains the statistic information about the sampled UE moving from the previous TA to the next TA. In practice, the MME may keep tracking a sampled UE for several TAU periods continuously. In such periods, the TA list allocated by the MME to the sampled UE includes only the TA currently visited by the sampled UE. In this way, the MME obtains continuous trace of the sampled UE moving between the TAs, and obtains more precise statistic information.

Figure 8:
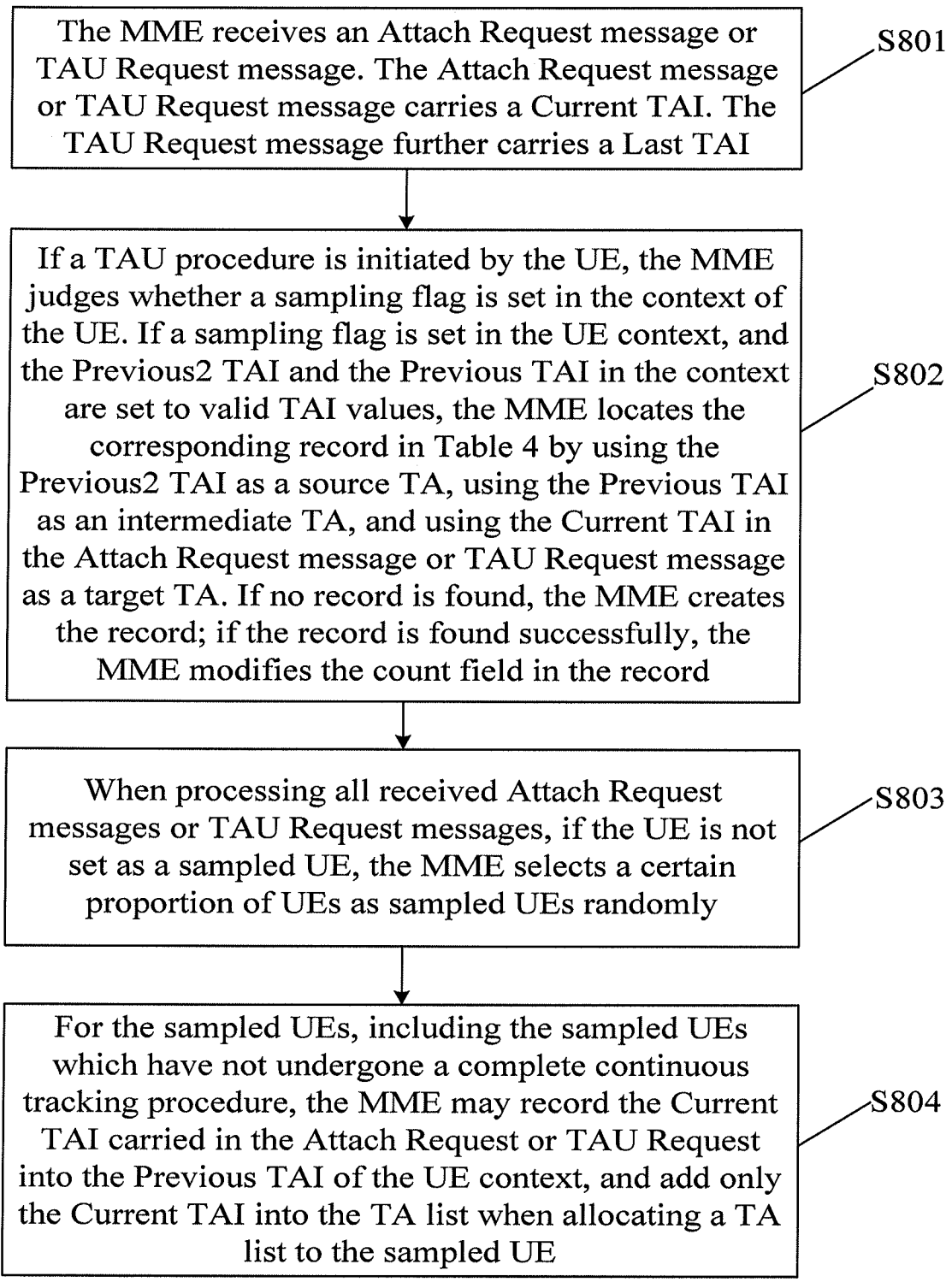
FIG. 8 is a method flowchart of a fourth embodiment of the present invention.

For that purpose, a fourth embodiment is put forward. In the fourth embodiment, the MME keeps tracking the sampled UE for two TAU periods continuously, and obtains continuous motion trace of the sampled UE between three TAs. Specifically, the MME may add two fields "Previous TAI" and "Previous2 TAI" into the context. The values of the two fields are initialized to invalid values. As shown in FIG. 8, the method in the fourth embodiment includes the following steps:

Step S801: The MME receives an Attach Request message or TAU Request message. The Attach Request message or TAU Request message carries a Current TAI. The TAU Request message further carries a Last TAI.

Step S802: If a TAU procedure is initiated by the UE, the MME judges whether a sampling flag is set in the context of the UE. If a sampling flag is set in the UE context, and the Previous2 TAI and the Previous TAI in the context are set to valid TAI values, the MME locates the corresponding record in Table 4 by using the Previous2 TAI as a source TA, using the Previous TAI as an intermediate TA (the value of the intermediate TA may also be obtained from the Last TAI in the TAU Request message), and using the Current TAI in the Attach Request message or TAU Request message as a target TA. If no record is found, the MME creates the record; if the record is found successfully, the MME modifies the count field in the record. As a way of modifying the count field, the MME may add 1 to the counter, or perform a weighting operation according to the property of the user of the UE, target TA, and time segment, namely, add a weighted value to the existing count.

TABLE 4

| Source TA | Intermediate TA | Target TA | Count | Percent | Percent order | Recent motion frequency (number of times per second, last 10 minutes) |
|---|---|---|---|---|---|---|
| TA1 | TA2 | TA1 | 10 | NA*1 | NA | 0.5 |
| TA1 | TA2 | TA2 | 40 | NA*2 | NA | 2.1 |
| TA1 | TA2 | TA3 | 850 | 93.4% | 1 | 10 |
| TA1 | TA2 | TA4 | 100 | 6.6% | 2 | 5.7 |
| TA3 | TA2 | TA2 | 100 | NA*2 | NA | 2.5 |
| TA3 | TA2 | TA1 | 1400 | 100% | 1 | 15.4 |
| TA2 | TA3 | TA3 | 300 | NA*2 | NA | 6.4 |
| TA2 | TA3 | TA5 | 700 | 100% | 1 | 12.5 |

*1 In this record, because the recent motion frequency is lower than the threshold, it is excluded from the factors for calculating and ranking the percents in this embodiment.
*2 In this embodiment, the records whose target TA is the current TA are not involved in calculating or ranking the percents.

Table 4 is only an example. In practice, the content of the table depends on the actual needs. For example, "Count" does not necessarily coexist with "Count after a scale factor is applied".

The MME calculates and refreshes the percent of motions to each target TA in real time or periodically after the UE moves from a source TA to an intermediate TA, ranks the motions according to the percent, and calculates the recent motion frequency.

If the Previous2 TAI of the UE is valid, namely, if a complete continuous tracking procedure (two TAU periods) is finished for the UE, the MME clears the sampling flag in the UE context, and sets the Previous TAI and the Previous2 TAI to an invalid value. If the Previous2 TAI of the UE is invalid, the MME sets the Previous2 TAI to the value of Previous TAI, and then sets the Previous TAI to the value of the Current TAI carried in the TAU Request message.

Step S803 occurs after step S802: When processing all received Attach Request messages or TAU Request messages, if the UE is not set as a sampled UE, the MME selects a certain proportion (such as 5%) of UEs as sampled UEs randomly. A sampling flag is affixed into the context of each sampled UE on the MME.

For the UEs located in different current TAs, the selected proportion of the UEs may vary.

Step S804: For the sampled UEs, including the sampled UEs which have not undergone a complete continuous tracking procedure, the MME may record the Current TAI carried in the Attach Request or TAU Request into the Previous TAI of the UE context, and add only the Current TAI into the TA list when allocating a TA list to the sampled UE. The MME may allocate the TA list to the sampled UE by sending an Attach Accept message or TAU Accept message.

For the UE not sampled, the MME searches Table 4 to select the target TAs to which the UE will probably move after the UE moves from the source TA to the intermediate TA, where the source TA is the TA identified by the Last TAI carried in the Attach Request or TAU Request (for the Attach Request message, the Current TAI may be a Last TAI concurrently), and the intermediate TA is the TA identified by the Current TAI; and then the MME adds the selected target TAs and the current TA of the UE into the TA list, and allocates the TA list to the UE.

In the fourth embodiment, the MME tracks the motion of the UE between the TAs by using only the Current TAI carried in the Attach Request message or TAU Request message. Therefore, after a UE is selected as a sampled UE, the MME needs to track the UE for two more continuous TAU periods to obtain the motion trace of the UE from the source TA to the intermediate TA and to the target TA. In fact, the TAU Request message carries a Last TAI in addition to the Current TAI. If the Last TAI is considered additionally, the MME can track the UE for only one TAU period after the UE is selected as a sampled UE, thus accomplishing the effect of the fourth embodiment.

Figure 9:
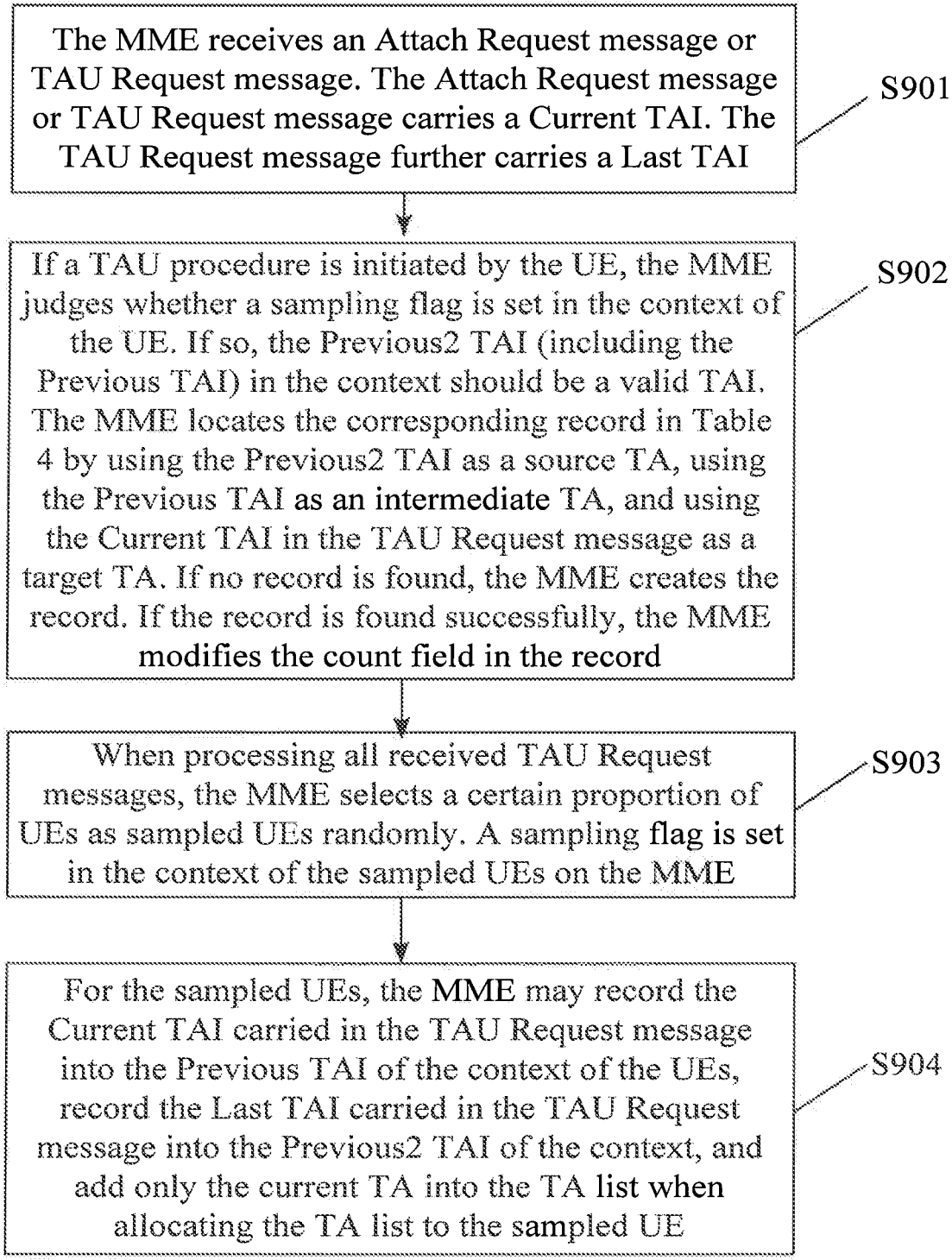
FIG. 9 is a method flowchart of a fifth embodiment of the present invention.

For that purpose, a fifth embodiment is put forward. Specifically, the MME still adds two fields "Previous TAI" and "Previous2 TAI" into the context of the UE. The values of the two fields are initialized to invalid values. As shown in FIG. 9, the method in the fifth embodiment includes the following steps:

Step S901: The MME receives an Attach Request message or TAU Request message. The Attach Request message or TAU Request message carries a Current TAI. The TAU Request message further carries a Last TAI.

Step S902: If a TAU procedure is initiated by the UE, the MME judges whether a sampling flag is set in the context of the UE. If so, the Previous2 TAI (including the Previous TAI) in the context should be a valid TAI. The MME locates the corresponding record in Table 4 by using the Previous2 TAI as a source TA, using the Previous TAI as an intermediate TA, and using the Current TAI in the TAU Request message as a target TA. If no record is found, the MME creates the record. If the record is found successfully, the MME modifies the count field in the record. As a way of modifying the count field, the MME may add 1 to the counter, or perform a weighting operation according to the property of the user of the UE, target TA, and time segment, namely, add a weighted value to the existing count.

The MME calculates and refreshes the percent of motions to each target TA in real time or periodically after the UE moves from a source TA to an intermediate TA, ranks the motions according to the percent, and calculates the recent motion frequency.

Now, a complete continuous tracking procedure (1 TAU period) is finished for the sampled UE, and the MME clears the sampling flag in the context of the UE.

Step S903 occurs after step S902: When processing all received TAU Request messages, the MME selects a certain proportion (such as 5%) of UEs as sampled UEs randomly. A sampling flag is affixed into the context of each sampled UE on the MME.

Step S904: For the sampled UEs, the MME may record the Current TAI carried in the TAU Request message into the Previous TAI of the context of the UEs, record the Last TAI carried in the TAU Request message into the Previous2 TAI of the context, and add only the current TA into the TA list when allocating the TA list to the sampled UE. The MME may allocate the TA list to the sampled UE by sending an Attach Accept message or TAU Accept message.

For the UEs which send an Attach Request message and the UEs not sampled, the MME searches Table 4 to select the target TAs to which the UE will probably move after the UE moves from the source TA to the intermediate TA, where the source TA is the TA identified by the Last TAI carried in the Attach Request or TAU Request (for the Attach Request, the Current TAI may be a Last TAI concurrently), and the intermediate TA is the TA identified by the Current TAI; and then the MME adds the selected target TAs and the current TA of the UE into the TA list, and allocates the TA list to the UE.

It should be noted that the embodiments of the present invention are not only applicable to the EPS, but also applicable to other network environments. When the embodiments of the present invention are applied to a Circuit Switched (CS) domain environment of the communication system, the MME in the foregoing embodiments is equivalent to a Mobile Switching Center (MSC) in the CS domain, and the basic paging area is a Location Area (LA) in the WCDMA system. When the embodiments of the present invention are applied to a GPRS/UMTS system, the MME in the foregoing embodiments is equivalent to a Serving GPRS Supporting Node (SGSN) in the GPRS/UMTS, and the basic paging area is a Routing Area (RA) in the Packet Switched (PS) domain of the WCDMA system. When the embodiments of the present invention are applied to a World Interoperability for Microwave Access (WiMax) system, the MME in the foregoing embodiments is equivalent to an Access Serving Node Gateway (ASN-GW) in the WiMax system, and the basic paging area is a paging area in the WiMax system.

Persons of ordinary skill in the art should understand that all or part of the steps of the method under the present invention may be implemented by a program instructing relevant hardware. The program may be stored in a computer readable storage medium. When the program runs, the steps of the method specified in any of the embodiments above can be performed. The storage medium may be a magnetic disk, CD-ROM, Read-Only Memory (ROM), or Random Access Memory (RAM).

Although the invention is described through some exemplary embodiments, the invention is not limited to such embodiments. It is apparent that those skilled in the art can make modifications and variations to the invention without departing from the spirit and scope of the invention. The invention is intended to cover the modifications and variations provided that they fall in the scope of protection defined by the following claims or their equivalents.

What is claimed is:

1. A method for allocating a tracking area (TA) list to a User Equipment (UE) which is performed by a Mobility Management Entity (MME) in an Evolved Packet System (EPS), the method comprising:
    determining, by the MME in the EPS, a TA currently visited by the UE; and
    allocating, by the MME in the EPS, a TA list to the UE based on a preset parameter and according to a history record that defines a motion trace of sample UEs located in the TA currently visited by the UE,
    wherein the preset parameter comprises at least one of: an upper threshold of a number of TAs in the TA list, or a threshold of a sum of probabilities of the sample UEs moving from the currently visited TA to adjacent TAs in the TA list.

2. The method for allocating a TA list according to claim 1, further comprising:
    determining the history record of a continuous motion trace of the sample UEs from at least one TA visited by the sample UEs before the sample UEs entering the TA currently visited by the UE to at least one another TA subsequently visited by the sample UEs.

3. The method for allocating a TA list according to claim 1, further comprising:
    receiving from the UE or a Radio Access Network an identifier (ID) of the TA currently visited by the UE,
    wherein the determining the TA currently visited by the UE comprises:
    determining the TA currently visited by the UE according to the received ID.

4. The method for allocating a TA list according to claim 2, wherein:
    if the ID of the at least one TA previously visited by the sample UEs is the ID of one TA: the ID of the one TA is the ID of a first TA last visited by the sample UEs before the sample UEs move to the currently visited TA.

5. The method for allocating a TA list according to claim 2, wherein:
    if the number of the ID of the at least one TA previously visited by the sample UEs is two, the one ID of the TAs is the ID of a first TA last visited by the sample UEs before the sample UEs move to the currently visited TA, while the other ID of the TAs is the ID of a second TA last visited by the UE before the UE moves to the first TA.

6. The method for allocating a TA list according to claim 1, wherein:
    the history record comprises timing information indicating respective units of times of each of the sample UEs in the currently visited TA moving to other TAs within a specific period.

7. The method for allocating a TA list according to claim 1, wherein:
    the history record comprises: an actual number of motions of the sample UEs moving from the TA currently visited by the UE to the TAs adjacent to the currently visited TA, or a result obtained after a scale factor has been applied to the actual number of motions.

8. The method for allocating a TA list according to claim 7, wherein:
    if the scale factor is less than 1, the actual number of motions corresponding to adjacent TAs inside the TA list allocated to the sample UEs located in the currently visited TA is divided by the scale factor, or the actual number of motions corresponding to the adjacent TAs outside the TA list allocated to the sample UEs located in the currently visited TA is multiplied by the scale factor.

9. The method for allocating a TA list according to claim 1, wherein:
    the motion trace of the sample UEs in the history record is the motion trace of UEs on which a sampling flag is set; and a TA list allocated to one of the sample UEs only comprises a TA currently visited by the sample UE.

10. The method for allocating a TA list according to claim 1, wherein:
    the TA list allocated to the UE comprises multiple continuous adjacent TAs; the multiple continuous adjacent TAs are a result of prediction performed according to the history record on trace of motion of the UE between the multiple continuous adjacent TAs.

11. The method for allocating a TA list according to claim 1, wherein:
    if a recent motion frequency corresponding to each specific TA incorporated in the TA list allocated to a UE reaches or exceeds a preset threshold of the recent motion frequency, the recent motion frequency corresponding to a specific TA refers to how many times a UE moves from a currently visited TA to the specific TA in a recent period, or refers to how many times a UE, which has moved from a previous TA to the currently visited TA, moves to the specific TA in the recent period.

12. A mobility management entity (MME) in an evolved packet system, comprising:
    a processor; and
    a memory coupled to the processor and having a plurality of instructions stored thereon which, when executed by the processor, cause the processor to:
    determine a tracking area (TA) currently visited by a User Equipment (UE); and
    allocate a TA list to the UE based on a preset parameter and according to a history record of a motion trace of sample UEs located in the TA currently visited by the UE, wherein:
        the preset parameter comprises at least one of: an upper threshold of number of TAs in the TA list, or a threshold of a sum of probabilities of the sample UEs moving from the currently visited TA to adjacent TAs in the TA list.

13. The apparatus for allocating a TA list according to claim 12, wherein:
    the processor is caused to:
    determine at least one TA visited by the sample UEs before the sample UEs entering the TA currently visited by the UE; and
    allocate the TA list to the UE according to the history record of a continuous motion trace of the sample UEs located in the TA currently visited by the UE, wherein the continuous motion trace of the sample UEs comprises a trace of the sample UEs moving from at least one TA previously visited by the sample UEs to the TA currently visited by the UE and to at least one other TA subsequently visited by the sample UEs.

14. The apparatus for allocating a TA list according to claim 12, wherein the processor is caused to: receive from the UE or a Radio Access Network an identifier (ID) of the TA currently visited by the UE, and determine the TA currently visited by the UE according to the received ID.

15. The apparatus for allocating a TA list according to claim 14, wherein the processor is caused to:
- obtain the ID of the currently visited TA and an ID of at least one TA previously visited by the sample UEs, wherein both of the IDs are reported by the UE; and
- determine the TA currently visited by the UE and determine the at least one TA visited by the sample UEs before the sample UEs entering the currently visited TA according to the IDs.

16. The apparatus for allocating a TA list according to claim 14, wherein if the ID of the at least one TA previously visited by the sample UEs is the ID of one TA: the ID of the one TA is the ID of a first TA last visited by the sample UEs before the sample UEs move to the currently visited TA.

17. The apparatus for allocating a TA list according to claim 14, wherein if the number of the ID of the at least one TA previously visited by the sample UEs is two: the one ID of the TAs is the ID of a first TA last visited by the sample UEs before the sample UEs move to the currently visited TA, while the other ID of the TAs is the ID of a second TA last visited by the UE before the UE moves to the first TA.

18. The apparatus for allocating a TA list according to claim 13, wherein the history record comprises timing information indicating respective units of times of each of the sample UEs in the currently visited TA moving to other TAs within a specific period.

\* \* \* \* \*